United States Patent
Rouillard et al.

(10) Patent No.: US 7,213,672 B2
(45) Date of Patent: May 8, 2007

(54) VEHICLE HYDROSTATIC TRANSMISSION CIRCUIT

(75) Inventors: Jean-Marie Rouillard, La Croix Saint Ouen (FR); Jean-Philippe Raisin, Crepy-en Valois (FR)

(73) Assignee: Poclain Hydraulics Industrie, Verberie (FR)

( * ) Notice: Subject to any disclaimer, the term of this patent is extended or adjusted under 35 U.S.C. 154(b) by 261 days.

(21) Appl. No.: 10/477,768

(22) PCT Filed: May 16, 2002

(86) PCT No.: PCT/FR02/01648

§ 371 (c)(1),
(2), (4) Date: Nov. 14, 2003

(87) PCT Pub. No.: WO02/092374

PCT Pub. Date: Nov. 21, 2002

(65) Prior Publication Data

US 2004/0128993 A1  Jul. 8, 2004

(30) Foreign Application Priority Data

May 17, 2001  (FR)  ................................. 01 06505

(51) Int. Cl.
*B60K 6/12*  (2006.01)
(52) U.S. Cl. ........................................ 180/305; 60/327
(58) Field of Classification Search .............. 180/305, 180/307, 308; 303/113.2, 115.5; 60/327, 60/329, 429

See application file for complete search history.

(56) References Cited

U.S. PATENT DOCUMENTS

| | | | | | |
|---|---|---|---|---|---|
| 3,952,511 | A | * | 4/1976 | Turner et al. | 60/430 |
| 4,189,921 | A | * | 2/1980 | Knapp | 60/445 |
| 4,476,680 | A | * | 10/1984 | Pollman et al. | 60/444 |
| 4,478,041 | A | * | 10/1984 | Pollman | 60/444 |
| 5,201,570 | A | | 4/1993 | Heren et al. | |
| 5,472,267 | A | * | 12/1995 | Tanguy et al. | 303/116.2 |
| 5,687,808 | A | * | 11/1997 | Watanabe et al. | 180/243 |
| 5,918,950 | A | * | 7/1999 | Maeda | 303/116.2 |
| 2002/0000752 | A1 | * | 1/2002 | Kusano et al. | 303/115.1 |
| 2003/0084781 | A1 | * | 5/2003 | Asano et al. | 91/363 R |

FOREIGN PATENT DOCUMENTS

| DE | 10017901 | 6/1999 |
|---|---|---|
| FR | 0505254 | 9/1992 |

* cited by examiner

Primary Examiner—Jeff Restifo
(74) Attorney, Agent, or Firm—Ladas & Parry LLP

(57) ABSTRACT

A hydrostatic transmission circuit for a vehicle having at least two displacement members (12) driven by at least one hydraulic motor (10) having a feed main duct and a discharge main duct (16, 18). Skid control means for controlling skidding of at least one displacement member comprise a skid control valve (20) and an additional valve (22) that are disposed in parallel on a main duct (16). At least the skid control valve (20) has a constriction of variable section, while the additional valve has two end positions (22A, 22B), in which its through sections are respectively at their maximum and at their minimum. Control means (UC, 26, 28) make it possible to cause said valves to move as a function of a skid situation detected by detection means (24).

19 Claims, 5 Drawing Sheets

VEHICLE HYDROSTATIC TRANSMISSION CIRCUIT

FIELD OF THE INVENTION

The present invention relates to a hydrostatic transmission circuit for a vehicle having at least two displacement members driven by at least one hydraulic motor having a feed main duct and a discharge main duct, a pressurized fluid source connected to said motor via the feed main duct, and skid control means for controlling skidding of at least one displacement member, which means comprise a skid control valve disposed on one of said main ducts and having a constriction of variable section, detection means for detecting a situation in which said displacement member is skidding, and control means suitable for adjusting the section of said constriction as a function of the detected situation.

BACKGROUND OF THE INVENTION

Document EP-A-0 505 254 shows a circuit of that type which, in the example given, has a reversible pump feeding four motors, each of which is coupled to a respective wheel. Speed sensors are associated with each of the wheels, and the measured speeds are transmitted to a processing device which controls constrictions disposed one per motor on one of the main ducts of each motor. When it is detected that one of the motors is racing, indicative of a skid situation, the through section of the constriction disposed on the main duct of that motor is reduced to cause head loss and to reduce the speed of the motor.

In general, the skid control system is useful under difficult driving conditions, in particular when the vehicle is traveling over difficult terrain and when skidding might occur on one or more wheels. Conversely, when the vehicle is traveling without any risk of skidding, e.g. on the road, the skid control system is deactivated. The constrictions are at their maximum section, so that the flow-rate of fluid in the main ducts is as high as possible in order to enable high speeds to be achieved.

SUMMARY OF THE INVENTION

The present invention applies in particular to hydrostatic transmission for a vehicle having one or more motors of large cubic capacity, in particular compactor rollers whose front roller is driven by a hydraulic motor having a large cubic capacity, e.g. from 5 liters (l) to 10 l, while the rear wheels are driven by one or two hydraulic motors, or else a sprayer vehicle having a plurality of motors having a plurality of active operating cubic capacities, where the ratio between the largest cubic capacity and the smallest cubic capacity is large, e.g. about 5.

Increasingly, efforts are being directed into developing hydrostatic transmissions that make it possible to deliver drive at high speeds and/or that deliver high torque. That is resulting in a considerable increase in the flow rate of the fluid that feeds the hydraulic motors and that is discharged therefrom compared with past hydraulic motors, in which the speeds and the torque were lower.

For example, for the above-described application to compactor rollers, the front roller is driven by a hydraulic motor having radial pistons of the "low speed, high torque" type and having a cubic capacity of from 5 l to 10 l, delivering maximum torque of approximately in the range 30,000 meter Newtons (m.N) to 60,000 m.N, and in which the flow rate in the main ducts is approximately in the range 250 liters per minute (l.p.m.) to 500 l.p.m. when the motor is turning over at 50 revolutions per minute (r.p.m.).

A constriction is a fluid passageway of calibrated section. When the constriction is adjustable, the fluid flow section can be modified but, even when the constriction is open to the maximum extent, the resulting maximum through section is smaller than the section of the ordinary fluid flow ducts in those portions of the ducts that are exempt from any constriction. As a result, even when the constriction is open to the maximum extent, head loss, i.e. a pressure gradient, is generated through said constriction.

When requirements as regards speed and torque delivered by the motor were lower, that head loss could be ignored. However, for a given section, the fluid pressure is proportional to the square of the flow rate, i.e. when the fluid flow rate increases, the head loss through a constriction increases in proportion to the square of the increase in the flow rate. For high flow rates, the power loss generated by the head loss observed through a constriction becomes large, and the circuits overheat.

An object of the invention is to remedy the above-described drawbacks by proposing a hydrostatic transmission circuit provided with skid control means that make it possible to control skidding reliably when they are activated, and that, when they are deactivated, limit the above-mentioned head loss.

This object is achieved by the fact that the skid control means for controlling skidding of said displacement member further comprise an additional valve disposed in parallel with the skid control valve, on a branch of the main duct on which said skid control valve is disposed, said additional valve having a first end position in which its through section is at its maximum and a second end position in which its through section is at its minimum, and being suitable for being caused to move between its end positions by the control means.

Thus, with the invention, the skid control valve and the additional valve are disposed on the main duct in question. When the skid control duct is deactivated, the two valves are set to offer maximum through section. The fluid flow rate is shared between the two branches formed in parallel on the main duct.

For example, when the maximum through sections of the two valves are equal to each other, the fluid flow rate is shared equally between the two branches. In which case, the pressure gradient due to the presence of the two valves is equal to one fourth of the pressure gradient that would be observed in a prior art system comprising only the skid control valve, without the additional valve disposed in parallel.

With the invention, it is not necessary to overdimension the hydraulic components. This offers an advantage form the point of view of the reliability of the anti-skid systems. If it was decided to implement a skid control valve having a maximum section that is considerably larger than the maximum sections of conventional valves, then the response time of the anti-skid system would be increased, the response time being the time required for the fluid flow section to be reduced sufficiently by operating the valve in response to a skid situation being detected. Either a moving member (slide of the valve) would have to be moved over a larger amplitude than in known valves, or else the moving member would itself have to be overdimensioned, and it would then be slower to move.

In a first advantageous variant embodiment, the additional valve is a two-position valve, and the control means are suitable for receiving information for activating or deactivating the skid control, and are suitable for placing the additional valve in its first end position in a skid control deactivated situation, and in its second end position in a skid control activated situation.

In which case, the additional valve always offers its minimum through section (which may be a zero section) in a skid control activated situation so that, when a skid situation is detected, e.g. by a detector measuring racing of a displacement member, only the skid control valve needs to be adjusted conventionally.

The response time is then exactly the same as for a system not having the additional valve disposed on the branch. However, in a skid control deactivated situation, the invention makes it possible to reduce the head loss as described above.

In a second advantageous variant, the additional valve has a constriction of variable section, and the control means are suitable for adjusting the section of said constriction as a function of the skid situation detected by the detection means.

In this variant, the additional valve is also used to make it possible for skidding to be controlled. When a skid situation is detected, the skid control valve and also the additional valve are both controlled to offer the optimum through section. The advantage of this variant lies in the fact that the available range of sections is much wider when two valves are used rather than a single valve.

In which case, advantageously, the circuit further comprises means for measuring the travel speed of the vehicle and, so long as its speed is lower than a given speed, i.e. for low flow rates, the control means hold the additional valve in its second end position and adjust the section of the constriction of the skid control valve as a function of the skid situation detected, which makes it possible to adjust the flow rate finely, while, when the speed is higher than said given speed, i.e. for higher flow rates, the control means adjust the sections of the constrictions of the skid control valve and of the additional valve as a function of the skid situation detected.

Thus, above the speed threshold determined by the given speed, skid control is performed by adjusting the section of the skid control valve and the section of the additional valve, and, in the absence of skidding, the head loss due to the presence of the skid control means is low because both valves are open. Below this threshold, only the skid control valve needs to be operated.

Advantageously, the control means are suitable for receiving information for activating or deactivating the skid control, and are suitable, when the skid control is activated, for placing the skid control valve in a standby situation in which the section of the constriction of said valve is smaller than the maximum section of said constriction, but larger than its minimum section.

As described above, when the skid control is deactivated, the constrictions of the skid control valve and of the additional valve are both adjusted to offer maximum through sections. When the skid control is activated, at least the skid control valve is placed in a standby situation. In this situation, the through sections are not at their maximum values but, because the anti-skid system is in general activated at relatively low speeds, the resulting head loss is generally low. Conversely, the choice of the standby position makes it possible to reduce the response time of the valve(s) placed in the standby situation when skidding is detected, since the strokes remaining to be traveled by the members for adjusting the through sections in order to reduce said sections sufficiently are naturally shorter than the strokes that would remain to be traveled if the valves initially offered their maximum through sections.

In an advantageous embodiment, the skid control valve has a slide mounted to move in translation in a bore connected at two distinct zones to a first duct connected to a main duct of the motor and to a second duct connected to a fluid feed duct for feeding fluid from the pressurized fluid source, or to a fluid discharge duct, said valve has a communication duct on which the constriction of said valve is disposed, and which is suitable for connecting said first and second ducts via a through section which is variable as a function of the position of the slide in the bore, and said skid control valve further has an anti-cavitation duct which is connected firstly to said first duct and secondly to a control chamber for causing the slide to move, which chamber is itself suitable for being connected to an auxiliary fluid source, said anti-cavitation duct being provided with a check valve suitable for enabling fluid to flow only in the direction going from said control chamber towards the first duct.

Advantage is thus taken of the fact that the skid control valve is disposed on a main duct of the motor so as to equip said valve with an additional function which is the function of avoiding cavitation in said duct.

Advantageously, the skid control valve and the additional valve are disposed in the same unit, which forms a hydraulic component and which has a body provided with at least two orifices for connection to a main duct, respectively upstream and downstream from the assembly formed by the skid control valve and by the additional valve.

In which case, the junction between the two parallel branches of the main duct on which the skid control valve and the additional valve are disposed is at least partially formed directly in the unit that contains the two valves. Said unit is mounted as a single hydraulic component, which naturally facilitates the mounting operations and the maintenance operations.

Advantageously, at least one valve serving to limit the pressure in the main duct to which said orifices of the body of the above-mentioned hydraulic component are to be connected is disposed in the body.

In which case, advantage is taken of the fact that the unit in which the skid control valve and the additional valve are disposed is connected to one of the main ducts of the motor so as to provide said unit with a pressure limiter function that is known per se for the purpose of avoiding excessive pressure in the motor.

The invention will be well understood and its advantages will appear more clearly on reading the following detailed description of an embodiment shown by way of non-limiting example. The description refers to the accompanying drawings, in which:

DETAILED DESCRIPTION OF THE PREFERRED EMBODIMENTS

Figure 1:
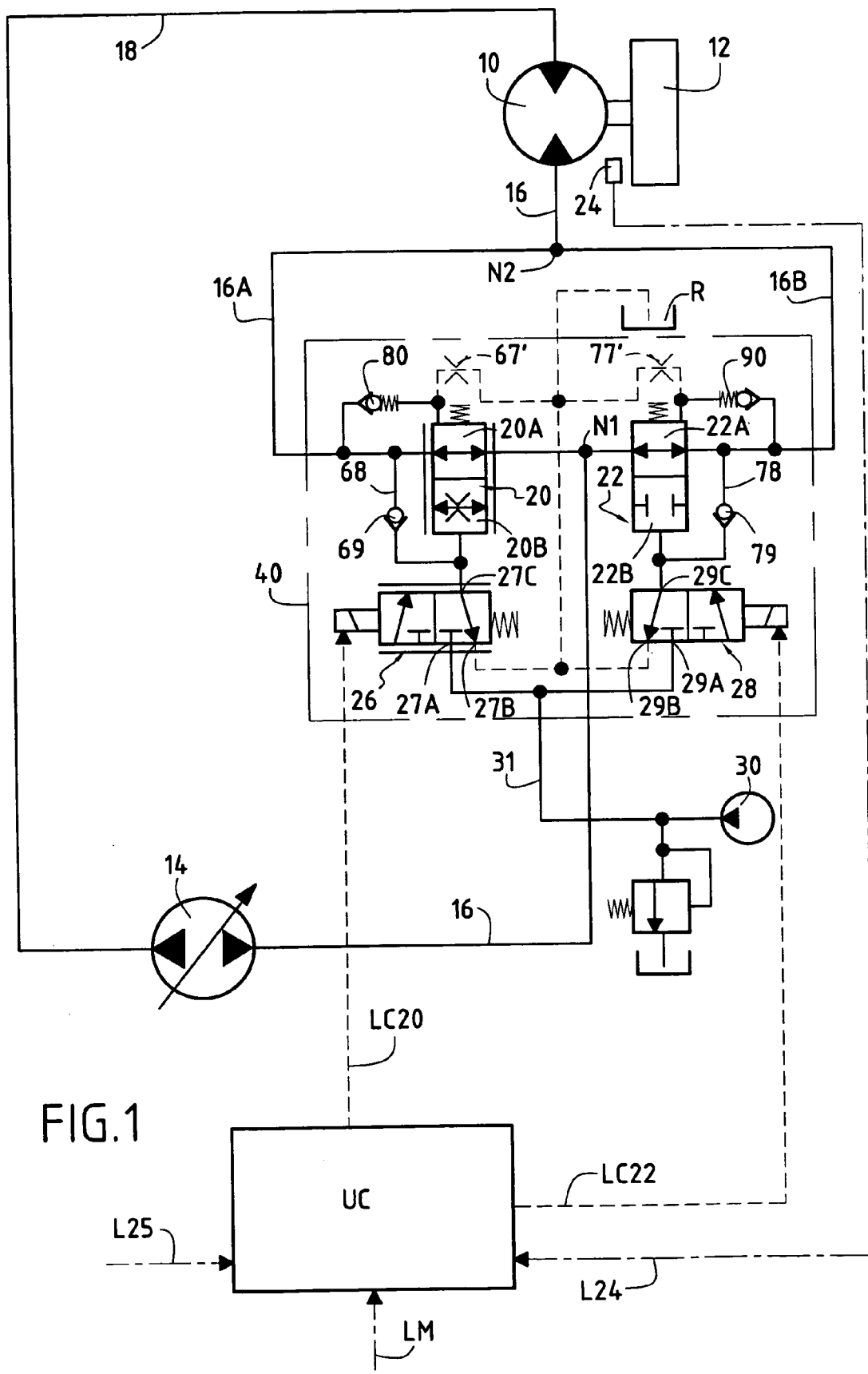
FIG. 1 shows a first variant of a circuit of the invention.

The circuit shown in FIG. 1 serves to feed fluid to a hydraulic motor 10 to which a displacement member 12 of a vehicle is coupled. Naturally, the vehicle has a plurality of displacement members such as wheels. For simplification reasons, only one of them is shown in FIG. 1. In reality, at least two displacement members, e.g. the two front wheels or the two rear wheels, are driven by respective ones of two different hydraulic motors, both of which are fed by the same hydraulic pump 14, or else each of which is fed by a distinct pump. For example, the vehicle may be a compactor roller whose front roller is driven by a hydraulic motor and whose two rear wheels are driven by one or two motors, preferably one or two hydraulic motors having radial pistons. At least one of the displacement members and, preferably, at least two displacement members are associated with skid control means. For example, from the point of view of the way in which the motors are disposed and are fed by the pump, the circuit may be analogous to the circuit described in Document EP-A-0 505 254.

In the example shown, the circuit is a closed circuit and the motor 10 has two main ducts 16 and 18 which, depending on the travel direction, serve as the feed duct or as the discharge duct, and which are connected to respective ones of the two orifices of the pump 14. The invention also applies to open circuits, i.e. in which the fluid source constituted by the pump is connected to the motor at least via the feed main duct, while the discharge main duct of the motor may be connected to a pressure-free reservoir.

The skid control means comprise a valve system which is disposed on one of the main ducts, and on duct 16 in this example. Said duct 16 has a junction and, starting from a node N1 situated between the pump 14 and the motor, it splits into two parallel ducts or parallel branches 16A and 16B which are connected to the motor, to the feed or to the discharge, depending on whether the duct 16 serves as a feed duct or as a discharge duct. In the example shown, the two duct segments join together at the node N2 before being connected to the same orifice of the motor.

The means for controlling skidding of the displacement means 12 comprise a skid control valve 20 which is disposed on the segment 16A and an additional valve 22 which is disposed on the segment 16B.

The skid control valve is a progressively-variable valve which is suitable, in its end position 20A, for offering a maximum through section and, in its opposite end position 20B, for offering a minimum through section. When the valve 20 is caused to move, its through section varies progressively between said two extreme sections.

The additional valve 22 has a first end position 22A in which its through section is at its maximum, and a second end position 22B in which its through section is at its minimum.

In the variant shown in FIG. 1, the valve 22 has only the two above-mentioned positions and, in its second end position 22B, its through section is zero.

In a manner known per se, the skid control means include means for detecting a situation in which the displacement member 12 is skidding. For example, a speed sensor 24 is provided in the vicinity of the outlet shaft of the motor 10. The information measured by said speed sensor 24 is transmitted via a transmission line L24 to a control unit UC preferably comprising a microprocessor. This unit analyzes the data transmitted via the line L24 and compares it with reference data, such as a speed or a flow rate measured elsewhere in order to verify whether it is indicative of a skid situation, in which case the outlet speed of the motor 10 must be reduced, which requires the through section via which the fluid flows in the valves 20 and 22 to be reduced, as described below. The above-mentioned reference data constitutes instantaneous references for the control unit UC.

The skid situation may be detected by sensing the outlet speed of the motor or the flow rate in one of its main ducts, or even by measuring a pressure variation between various ducts of the circuit.

Since the vehicle has a plurality of displacement members, the unit UC also receives analogous data relating to other displacement members via one or more lines L25.

The control unit UC can act via a control line LC20 to cause the section of the constriction of the valve 20 to vary between the sections that it has in its two end positions, and it can also act via a control line LC22 to cause the valve 22 to go between its two end positions. In reality, the valves 20 and 22 are controlled by fluid pressure, and the lines LC20 and LC22 directly control respective solenoid valves, namely a solenoid valve 26 associated with the valve 20 and a solenoid valve 28 associated with the valve 22. Each solenoid valve has three ports, namely a first port 27A, 29A which is connected to a booster duct 31 fed by a booster pump 30, a second port 27B, 29B which is connected to a pressure-free reservoir R, and a third port 27C, 29C which is connected to a control chamber of the respective valve 20, 22. Depending on their positions, the solenoid valves 26 and 28 put their third ports 27C and 29C into communication respectively with the booster duct 31 or with the pressure-free reservoir R.

Via a line LM, the control unit UC can receive information for activating or deactivating the skid control system. For example, if the motor has a plurality of active operating cubic capacities, it is possible to make provision for the system to be placed automatically in a skid control system deactivated situation when the motor is in its small cubic capacity configuration so that the vehicle can travel at high speeds.

When the skid control is deactivated, both of the valves 20 and 22 are placed in their respective first positions in which the through sections in the duct segments 16A and 16B are at their maximum values.

In the variant shown in FIG. 1, going over to the skid control activated mode causes the control unit UC to place the valve 22 in its second end position 22B. Thus, if skidding is detected, skidding is controlled by varying the fluid flow section in the valve 20 only.

The valves 20 and 22, and the solenoid valves 26 and 28 are disposed in the same unit 40 forming a hydraulic component. The physical conformation of this component is shown in detail in the section view of FIG. 2.

Figure 2:
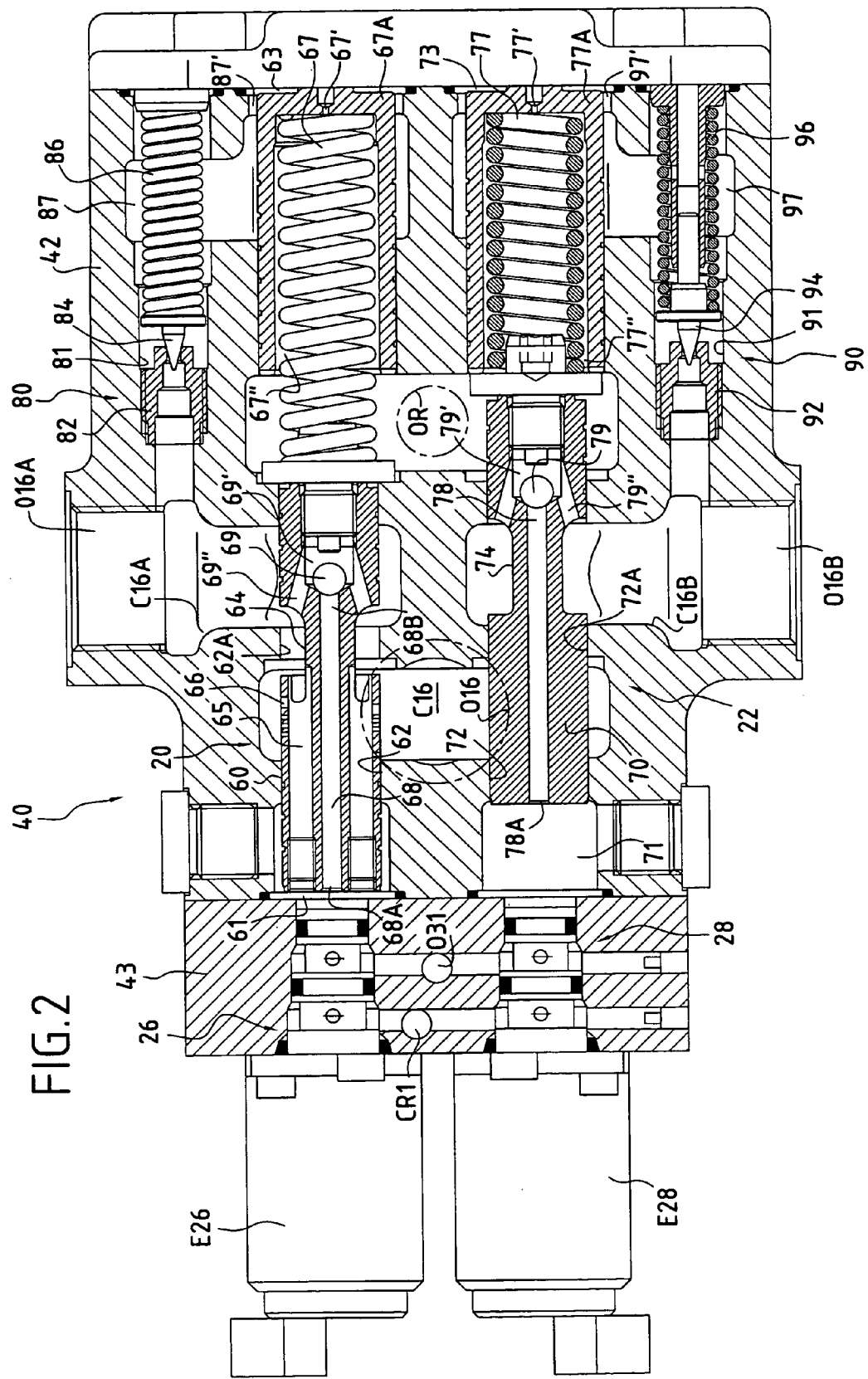
FIG. 2 shows a hydraulic component incorporating the skid control valve and the additional valve in the first variant.

FIG. 2 shows that it has a body 42 provided with an orifice O16 serving to be connected to the main duct 16 and with two orifices O16A and O16B serving to be connected to respective ones of the segments 16A and 16B forming the two parallel branches of said duct. The skid control valve 20 has a slide 60 disposed in a bore 62 which is provided inside the body 40 and to which the orifices O16A and O16B are connected at respective connection zones, by respective ones of ducts C16 and C16A.

Depending on the position of the slide 60, the outside periphery of said slide co-operates with a portion 62A of the wall of the bore that is disposed between said connection zones, so as to put the ducts C16 and C16A into communication with each other to various extents (with various through section sizes).

For example, the slide 60 is provided with a groove 64 which, in the position shown in FIG. 2 makes it possible for the ducts C16 and C16A to communicate substantially freely. However, it should be noted that, even in this situation, the presence of the slide in the passageway defined by the portion 62A of the wall of the bore 62 locally reduces the fluid flow section, compared with a situation in which the passageway is totally unobstructed. Head loss thus ensues.

The valve 20 is a progressively-variable valve. A duct 65 is provided in the slide 60 and communicates firstly with the groove 64 and secondly with a series of orifices 66 which open onto the axial wall of the slide 60. Said orifices advantageously have different sizes and it can be understood that, when they are masked to various extents by the portion 62A of the bore 60, the through section between the duct C16 and the duct C16A is reduced to various extents.

The portion 62A of the bore 60 thus constitutes a communication duct between the ducts C16 and C16A, in which duct the constriction of the valve 20 is disposed, and which duct is suitable for interconnecting said ducts C16 and C16A via a through section that varies as a function of the position of the slide in its bore.

The additional valve 22 has a slide 70 which is disposed in a bore 72, itself connected at respective distinct zones to the orifice O16 and to the orifice O16B, via respective ones of the ducts C16 and C16B. The periphery of the slide 72 is provided with a groove 74 which, when it faces a portion 72A of the bore 72, enables the ducts C16 and C16B to be interconnected substantially freely, whereas, when the peripheries of the slides co-operate with said portion 72A, said communication is no longer possible.

In the situation shown in FIG. 2, the skid control valve 20 is shown in its first end position, while the additional valve 22 is shown in its second end position.

The slides 60 and 70 of the valves 20 and 22 are moved between their various positions by solenoid valves 26 and 28 mounted in a body 43 secured to the body 42 or forming one piece therewith. Said solenoid valves are themselves controlled by solenoids E16 and E28 connected to the above-mentioned control lines LC20 and LC22. The body 43 has an orifice O31 suitable for being connected to the booster duct 31. Said orifice communicates with the bores of the slides of the valves 26 and 28 (shown diagrammatically as seen from outside) so as to form respective ones of their first ports while their second ports are suitable for being connected to a pressure-free reservoir via a connection duct CR1 which is connected via a duct (not shown) to an orifice OR of the body 42 that forms a leakage return orifice, connected to a pressure-free reservoir. The third port of the valve 26 is connected to the control chamber 61 of the valve 20, while the third port of the valve 28 is connected to the control chamber 71 of the valve 22. In FIG. 2, the control chamber 61 is connected to the pressure-free reservoir, while the control chamber 71 is connected to the booster so as to be fed with fluid and so as to urge the slide 70 into its second position.

Resilient return means, respectively springs 67 and 77, co-operate with ends of the slides 60 and 70 opposite from the control chambers 61 and 71 so as to urge said slides continuously towards their respective first positions.

The valve 20 further has an anti-cavitation duct that makes it possible to connect the main duct on which said valve is disposed to the booster duct 31 in order to avoid cavitation phenomena when said main duct ceases to be fed by the main pump 14 of the circuit.

The anti-cavitation duct 68 is connected firstly to the duct C16A and secondly to the control chamber 61. In the example shown, the anti-cavitation duct 68 is formed by an axial bore in the slide 60, a first end 68A of which bore is situated at that end of the slide at which the control chamber 61 is formed, the second end 68B of the bore being formed in a portion of the slide that is suitable for communicating with the orifice O16A regardless of the position of said slide.

A check valve is formed in the anti-cavitation duct in order to enable fluid to flow only in the direction going from the control chamber 61 to the orifice O16A. For example, the second end 68B of the above-mentioned axial bore forms a seat for a ball 69 situated in a cavity 69' which communicates with the groove 64 via one or more duct portions 69''. At its end opposite from the duct 68, the cavity 69' is closed by a cap screwed onto the end of the slide and with which the above-mentioned resilient return means 67 co-operate.

Advantageously, an analogous anti-cavitation system is provided in the valve 22. It can be seen that the slide of said valve 22 includes an anti-cavitation duct 78 which extends from a first end 78A in communication with the control chamber 71 to a second end 78B forming a seat for the ball 79 of a check valve, said ball being disposed in a cavity 79' which communicates with the groove 74 via one or more ducts 79''. Said duct makes it possible to avoid cavitation by connecting the duct C16B to the booster duct 31.

In the example shown, the orifice O16 and the orifices O16A & O16B are connected to the same main duct 16 respectively upstream from and downstream from the valve. The node N1 forming the junction at which the duct 16 branches into the ducts 16A and 16B lies inside the body 40. The node N2 is shown disposed outside in order to make the drawings clearer, but it could be integrated in said valve.

In general manner, the valve body 42 has at least a first orifice and a second orifice serving to be connected to a main duct, respectively upstream from and downstream from the assembly formed by the skid control valve and by the additional valve.

Advantageously, at least one valve serving to limit the pressure in the main duct to which said orifices are to be connected is disposed in the body 42. In the example shown, one valve of this type is provided for each of the branches 16A and 16B, said valves being associated respectively with the valve 20 and with the valve 22 or 122.

Thus, the valve 80 formed in the body 42 has a bore 81 extending between the first duct C16A and a duct for connecting to the pressure-free reservoir and comprising the chamber 87, the passageway 87', the constriction 67' formed in the support 67A of the spring 67 and the chamber 67'' of said spring that is connected continuously to the return orifice OR. A calibrated constriction 82 forming a small fluid flow section is disposed in said bore 81. Said constriction is normally closed off by a needle 84 which is continuously urged back into the closure position by resilient return means 86.

An analogous pressure-limiting valve 90 is connected to the duct C16B because a bore 91 extending between said duct and a duct connecting to the pressure-free reservoir contains a constriction 92 that is normally closed off by a needle 94 continuously urged back into its closure position by resilient return means 96.

For this valve, the duct for connecting to the pressure-free reservoir is formed by the chamber 97, the passageway 97', the constriction 77' provided in the support 77A of the spring 77 and the chamber 77'' in which said spring is situated, said chamber being connected continuously to the return orifice OR and being separated from a chamber 63 by the constriction.

The valve 90 is normally opened when, with the valve 22 or 122 being in its second position or in the vicinity thereof, said valve 22 or 122 causes considerable head loss between the orifices O16 and O16B, thereby causing the pressure to increase at O16B. In which case, said increased pressure pushes the needle 94 away in the valve-opening direction, thereby generating fluid pressure in the chamber 97. Via the passageway 97', said pressure is exerted on the support 77A of the spring 77 by means of the constriction 77', which prevents the fluid from passing freely from the chamber 73 to the chamber 77", these two chambers being provided on either side of the support of the spring 77A.

As a result, the support 77A and the spring 77 move (leftwards) while urging the slide 70 or 170 to move towards its first position, thereby opening up the passageway between the orifice O16B and the duct C16, so that the increased pressure at O16B flows into said duct. Depending on the diameter of the constriction 77', a small portion of excess fluid drains directly to the orifice OR, via the chamber 77". This connection to the orifice OR via the constriction 77' makes it possible to empty the chamber 73 so as to facilitate returning the slide 70 to its second position when the valve 90 closes again.

The valve 80 operates analogously in the event of a pressure increase in the duct C16A.

The chambers 63 and 73 are inverse control chambers having effects opposite to the effects of the chambers 61 and 71. By means of the respective valves 80 and 90 opening, the chambers 63 and 73 are suitable for being fed with fluid so as to urge the slides 60 and 70 to move towards their respective first end positions, while the control chambers 61 and 71 being fed with fluid urges said slides to move towards their respective second positions.

The additional valve 22 or 122 has a physical conformation analogous to the physical conformation of the valve 20 (except that, depending on whether it is the valve 22 or the valve 122, it has a constriction that is progressive or not progressive).

The valves 80 and 90 are shown in FIG. 1, represented by standardized symbols. Likewise, the anti-cavitation ducts 68 and 78, and their check valves 69 and 79 are shown in FIG. 1.

Figure 3:
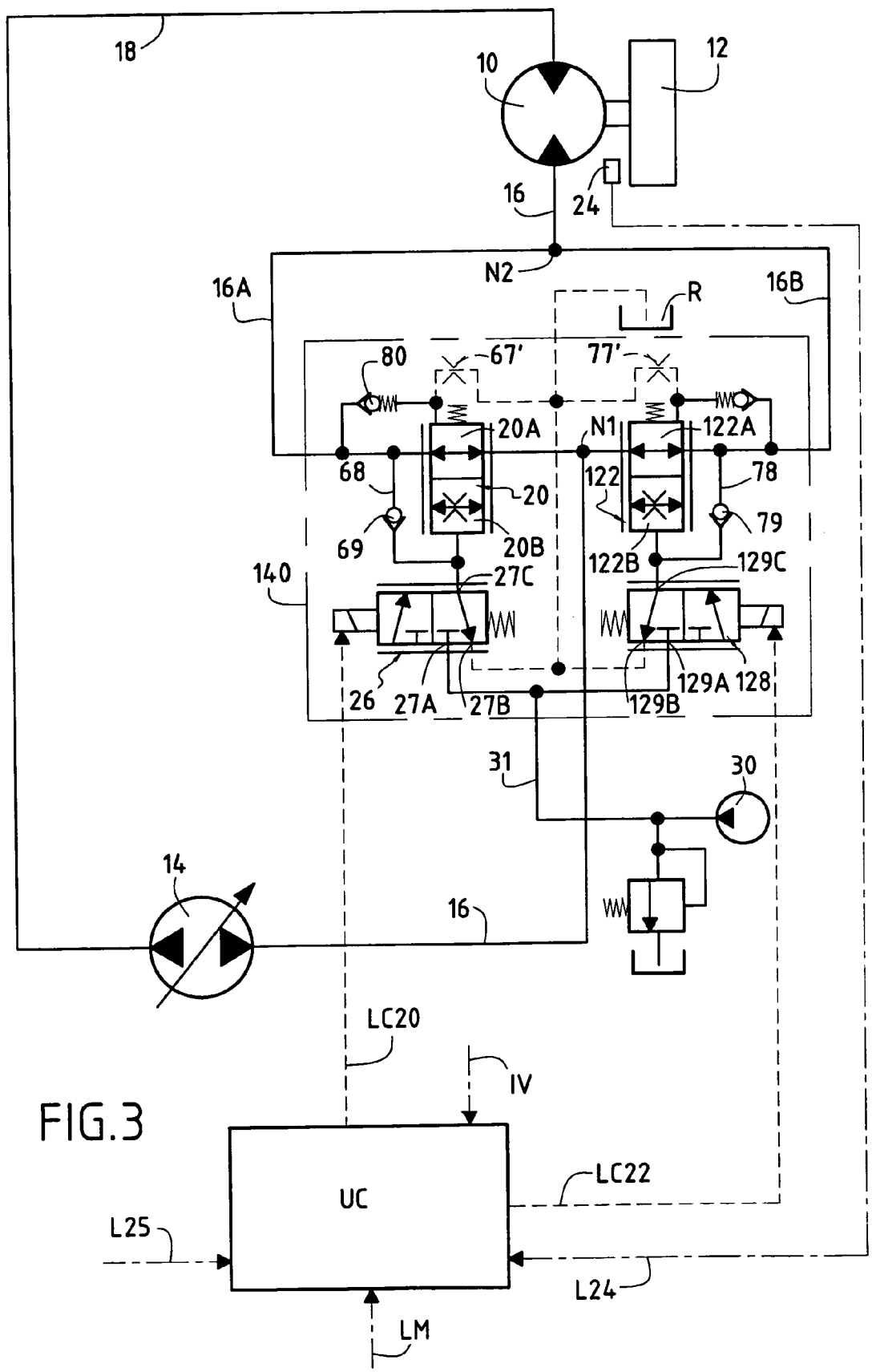
FIG. 3 shows a second variant of a circuit of the invention.
Figure 4:
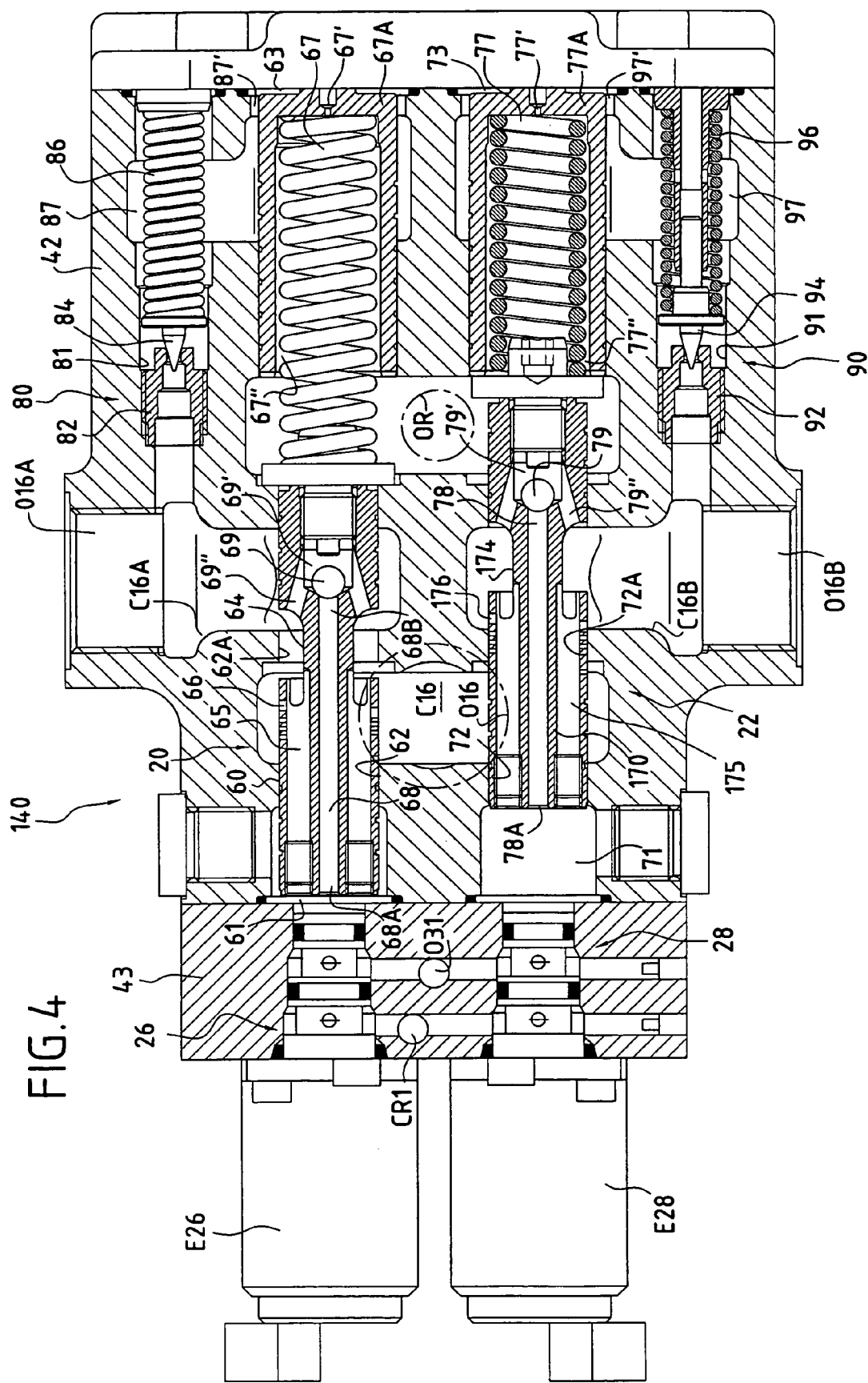
FIG. 4 shows a hydraulic component incorporating the skid control valve and the additional valve in the second variant.

There follows a description of the variant shown in FIGS. 3 and 4 in which elements unchanged relative to FIGS. 1 and 2 retain the references that they are given in FIGS. 1 and 2.

As shown in FIG. 3, the skid control valve 20 and its control valve 26 are unchanged compared with FIG. 1.

Conversely, the additional valve 122 differs from the additional valve 22 of FIG. 1 in that it is not a two-position valve, but rather it is a progressively-variable valve whose position can vary between two end positions, respectively 122A, in which its through section is at its maximum, and 122B, in which the through section is at its minimum. It is advantageous for the minimum through section of the valve 122 to be non-zero, so that it can be controlled smoothly, while avoiding pressure jolts.

In order to cause said valve to move progressively, the control solenoid valve 128 is itself a progressively-variable valve. However, like the valve 28, it has three ports, respectively 129A, 129B, and 129C connected respectively to the booster duct 31, to a fluid return duct, and to the hydraulic control chamber of the control valve, i.e. valve 122 in this example.

In the example shown in FIG. 3, the control means comprise a first control (control line LC20, and solenoid valve 26) for the skid control valve 20, and a second control (control line LC22 and solenoid valve 128) for the additional valve 122, it thus being possible for the two valves to be controlled separately.

However, when the additional valve is a progressively-variable valve, like the skid control valve, it is possible to make provision for the control means to comprise a common control for both of these valves which are then controlled simultaneously. For example, the lines LC20 and LC22 separate only at the outlet of the control unit UC. It is also possible to form a common control by using only one solenoid valve for both valves 20 and 122.

As shown in FIG. 4, the hydraulic component 140 differs from the component 40 of FIG. 2 by the shape of the slide 170 of the additional valve. This slide is analogous to the slide 60 of the valve 20 since, like that slide, it has a constriction whose through section (in this example, between the ducts C16 and C16B) varies as a function of the position of the slide in its bore. It is formed in the same way as the slide 60, an axial duct 175 putting holes 176 provided in the wall of the slide into communication with the groove 174 in said slide, said holes being masked to various extents by the portion 72A of the bore 72. Otherwise, the analogous hydraulic component 140 is analogous to the component 40 and in particular includes the anti-cavitation systems and the valves avoiding excess pressure in the feed ducts of the motor of said component.

As shown in FIG. 3, the control unit can receive information IV relating to the speed at which the vehicle is traveling, as measured by the suitable means. It can be programmed so that, so long as the speed is lower than a given speed, the additional valve 122 is held in its second end position (by causing the solenoid valve 128 to go to its position in which it enables the control chamber 71 to be fed with the booster fluid). In which case, when such a skid situation is detected, only the skid control valve 20 is caused to move so as to generate head loss when necessary.

The programming can be such that, when the speed becomes lower than said given speed, the skid control valve and the additional valve are both caused to generate had loss when necessary in order to control the skidding. Thus, when the speed is greater than the given speed and when no skidding is detected, the two valves can take up their first end positions in which each of them offers its maximum through section enabling the flow-rate of fluid necessary for obtaining high speeds to flow through without significant head loss.

It is possible to choose the constrictions of the skid control valve 20 and of the additional valve 122 to have the same section variation relationship (identical slides 60 and 170 and identical springs 67 and 77).

It is possible to prefer to choose the constrictions of the skid control valve 20 and of the additional valve 122 to have different section variation relationships as a function of the application in question.

The solenoid valves 26 and 128 may be constituted by an electro-hydraulic proportional pressure reducer or by an electro-hydraulic proportional pressure limiter, so as to obtain a command proportional to the signal transmitted by the control unit UC so as to perform the desired adjustment on the constrictions 66 and 176.

The solenoid valve 28 may be analogous to the solenoid valves 26 and 128, or else it may merely be a two-position solenoid valve.

By means of the line LM, the control unit UC receives information as to whether the skid control is in the activated mode or in the deactivated mode. In the variant shown in FIGS. 1 and 2, activating the skid control causes the control unit UC to place the additional valve 22 in its second end position. Advantageously, such activation also causes the unit UC to place the valve 20 in an intermediate standby position between its two end positions 20A and 20B, in which intermediate position the through section of its constriction is slightly smaller than the maximum section and is larger than its minimum through section. For example, in the standby position, the slide has been moved from its first end position over about one fourth of its stroke towards its second end position. This makes it possible to improve the reactivity of the skid control system in the event of skidding.

In the variant shown in FIGS. 3 and 4, activating the skid control advantageously causes the control unit UC to place the valves 20 and 122 in standby positions, in which the sections of their constrictions are (slightly) smaller than their maximum sections but larger than their minimum sections, also for the purpose of increasing the reactivity of the skid control system.

Figure 5:
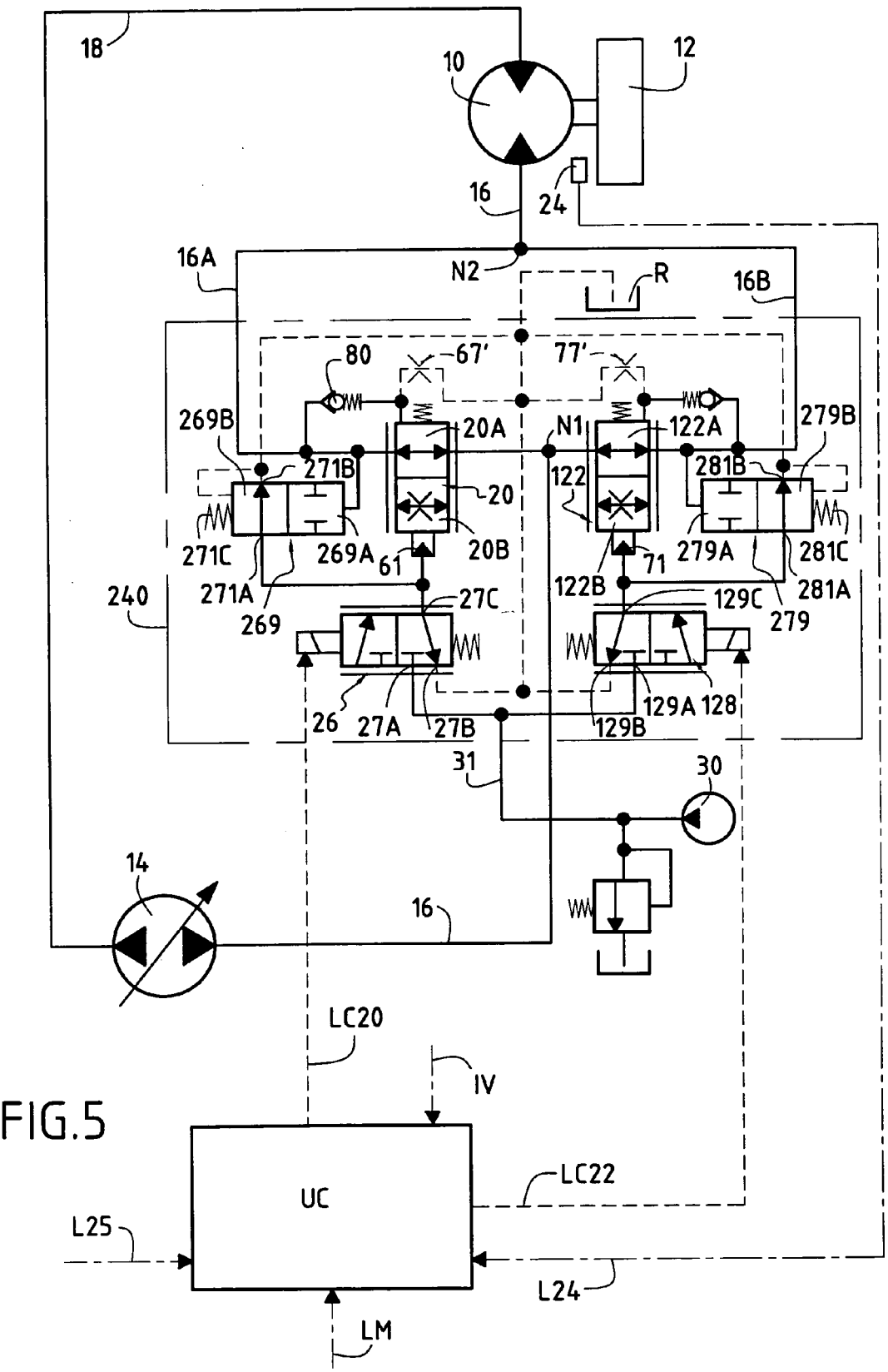
FIG. 5 shows a third variant of a circuit of the invention.

The variant shown in FIG. 5 relates to the anti-cavitation means of the circuit. It is adaptable to the variants of the preceding figures. Those elements shown in FIG. 5 which are unchanged compared with FIG. 3 are designated by like references. With this variant, the anti-cavitation means make it possible to place the valve 20, 22, or 122 in its position in which its through section is at its maximum when the pressure in the main duct 16 decreases to a determined threshold, corresponding in general to the minimum booster pressure. Preferably, since the valve naturally occupies this position (under drive from the resilient return means), the anti-cavitation means prevent the valve from being caused to move away from said position.

In FIG. 5, the check valves 69 and 79 of FIG. 3 are replaced with two-port and two-position selectors 269 and 279.

The selector 269 has a first port 271A connected to the control chamber 61 of the valve 20 and a second port 271B connected to the pressure-free reservoir R. This selector is controlled by the fluid pressure prevailing in the main duct segment 16A against the drive from a spring 271C whose rating corresponds to the minimum booster pressure.

Similarly, the two ports 281A and 281B of the selector 279 are respectively connected to the control chamber 71 of the valve 122 and to the pressure-free reservoir R. The selector is controlled by the fluid pressure in the main duct segment 16B against the drive from the spring 281C rated to the booster pressure.

So long as the pressure in the main duct segment 16A or 16B remains higher than the minimum booster pressure, the selector 269 or 279 occupies its first position 269A or 279A, into which it is caused to move against the spring 271C or 281C. In which case, the control chamber 61 or 71 of the valve 20 or 122 is isolated from the reservoir R, and said valve 20 or 122 can thus be controlled normally.

Conversely, when the pressure in the segment 16A or 16B becomes lower than the booster pressure, the spring 271C or 281C returns the selector 269 or 279 into its second position 269B or 279B, so that the chamber 61 or 71 is connected to the reservoir, thereby preventing the valve 20 or 122 from being moved, which valve remains in its first position 20A or 122A. As a result, the motor is connected to that orifice of the pump which is connected to the main duct 16 via a maximum connection section.

The invention claimed is:

1. A hydrostatic transmission circuit for a vehicle having at least two displacement members driven by at least one hydraulic motor having a feed main duct and a discharge main duct a pressurized fluid source connected to said motor via the feed main duct, and skid control means for controlling skidding of at least one displacement member, which means comprise a skid control valve disposed on one of said main ducts and having a constriction of variable section, detection means for detecting a situation in which said displacement member is skidding, and control means suitable for adjusting the section of said constriction as a function of the detected situation, said skid control means for controlling skidding of said displacement member further comprising an additional valve disposed in parallel with the skid control valve, on a branch of the main duct on which said skid control valve is disposed, said additional valve having a first end position in which its through section thereof is at its maximum and a second end position in which said through section is at its minimum, and being suitable for being caused to move between its end positions by the control means.

2. A circuit according to claim 1, wherein the additional valve is a two-position valve, and the control means are suitable for receiving information for activating or deactivating the skid control, and are suitable for placing the additional valve in its first end position in a skid control deactivated situation, and in its second end position in a skid control activated situation.

3. A circuit according to claim 1, wherein the additional valve has a constriction of variable section, and the control means are suitable for adjusting the section of said constriction as a function of the skid situation detected by the detection means.

4. A circuit according to claims 3, wherein the constrictions of the skid control valve and of the additional valve have the same section variation relationship.

5. A circuit according to claims 3, characterized in that the constrictions of the skid control valve and of the additional valve have different section variation relationships.

6. A circuit according to claim 3, further comprising means for measuring the travel speed of the vehicle, wherein, so long as the measured speed is lower than a given speed, the control means hold the additional valve in the second end position thereof and adjust the section of the constriction of the skid control valve as a function of the skid situation detected, while, when the measured speed is higher than said given speed, the control means adjust the sections of the constrictions of the skid control valve and of the additional valve as a function of the skid situation detected.

7. A circuit according to claim 1, wherein the control means comprise a first control for the skid control valve and a second control for the additional valve, the two valves thus being controlled separately.

8. A circuit according to claim 1, wherein the control means comprise a common control for the skid control valve and for the additional valve, the two valves thus being controlled simultaneously.

9. A circuit according to claim 1, further comprising means for measuring the travel speed of the vehicle, wherein, so long as the measured speed is lower than a given speed, the control means hold the additional valve in the second end position thereof and adjust the section of the constriction of the skid control valve as a function of the skid situation detected, while, when the measured speed is higher than said given speed, the control means adjust the sections of the constrictions of the skid control valve and of the additional valve as a function of the skid situation detected.

10. A circuit according to claim 1, wherein the control means are suitable for receiving information for activating or deactivating the skid control, and are suitable, when the skid control is activated, for placing the skid control valve in a standby situation in which the section of the constriction of said valve is smaller than the maximum section of said constriction, but larger than its minimum section.

11. A circuit according to claims 1, wherein the skid control valve has a slide mounted to move in translation in a bore connected at two distinct zones to a first duct connected to a main duct of the motor and to a second duct connected to a fluid feed duct for feeding fluid from the pressurized fluid source, or to a fluid discharge duct, the skid control valve having a communication duct on which the constriction of said valve is disposed, and which is suitable for connecting said first and second ducts via a through section which is variable as a function of the position of the slide in the bore.

12. A circuit according to claim 11 wherein the skid control valve further has an anti-cavitation duct which is connected firstly to said first duct and secondly to a control chamber for causing the slide to move, which chamber is itself suitable for being connected to an auxiliary fluid source, said anti-cavitation duct being provided with a check valve suitable for enabling fluid to flow only in the direction going from said control chamber towards the first duct.

13. A circuit according to claim 12, comprising an associated valve associated with the skid control valve, and suitable for connecting the first duct to an inverse control chamber suitable for being fed with fluid by opening said associated valve in order to urge the slide to move towards its first end position, while feeding the control chamber with fluid that urges said slide to be moved towards its second end position.

14. A circuit according to claim 13, wherein the additional valve, has a shape analogous to the shape of the skid control valve, and is associated with an associated valve operating analogously to the associated valve which is associated with said skid control valve.

15. A circuit according to claim 1, wherein the skid control valve and the additional valve are disposed in the same unit, which forms a hydraulic component and which has a body provided with at least two orifices for connection to a main duct, respectively upstream and downstream from the assembly formed by the skid control valve and by the additional valve.

16. A circuit according to claim 15, wherein at least one valve serving to limit the pressure in the main duct to which said orifices are to be connected is disposed in the body.

17. A circuit according to claim 1 further comprising anti-cavitation means suitable for placing at least one of the valves that constitute the skid control valve and the additional valve in a position in which the through section of said valve is at a maximum thereof when the pressure in the main duct decreases to a determined threshold.

18. A circuit according to claim 1, wherein the skid control valve further has an anti-cavitation duct which is connected firstly to said first duct and secondly to a control chamber for causing the slide to move, which chamber is itself suitable for being connected to an auxiliary fluid source, said anti-cavitation duct being provided with a check valve suitable for enabling fluid to flow only in the direction going from said control chamber towards the first duct and wherein the circuit comprises an associated valve associated with the skid control valve, and suitable for connecting the first duct to an inverse control chamber suitable for being fed with fluid by opening said associated valve in order to urge the slide to move towards its first end position, while feeding the control chamber with fluid urges said slide to be moved towards its second end position.

19. A circuit according to claim 18, wherein the additional valve has a shape analogous to a shape of the skid control valve, and is associated with an associated valve operating analogously to the associated valve which is associated with said skid control valve.

* * * * *